United States Patent
Vogt et al.

(10) Patent No.: US 8,111,917 B2
(45) Date of Patent: Feb. 7, 2012

(54) METHOD FOR SEGMENTING AND COMPUTING THE PATTERN OF A ROAD

(75) Inventors: Wilhelm Vogt, Lichtenau (DE); Ulrich Kersken, Diekholzen (DE); Axel Varchmin, Giesen (DE)

(73) Assignee: Robert Bosch GmbH, Stuttgart (DE)

( * ) Notice: Subject to any disclaimer, the term of this patent is extended or adjusted under 35 U.S.C. 154(b) by 1028 days.

(21) Appl. No.: 11/579,233

(22) PCT Filed: Mar. 31, 2005

(86) PCT No.: PCT/EP2005/051469
§ 371 (c)(1),
(2), (4) Date: Feb. 15, 2008

(87) PCT Pub. No.: WO2005/111543
PCT Pub. Date: Nov. 24, 2005

(65) Prior Publication Data
US 2008/0247645 A1   Oct. 9, 2008

(30) Foreign Application Priority Data
May 12, 2004   (DE) .......................... 10 2004 023 399

(51) Int. Cl.
*G06K 9/34*   (2006.01)
*G01C 21/00*   (2006.01)
(52) U.S. Cl. ........................................ 382/173; 701/200
(58) Field of Classification Search .................. 382/113, 382/173, 181, 312, 305; 701/200, 201, 206, 701/208, 209, 212; 345/584, 587
See application file for complete search history.

(56) References Cited

U.S. PATENT DOCUMENTS

| | | | |
|---|---|---|---|
| 6,366,927 B1 | 4/2002 | Meek et al. | |
| 6,941,221 B2 * | 9/2005 | Draeger et al. | 701/208 |
| 7,002,578 B1 * | 2/2006 | Ritter | 345/427 |
| 7,197,500 B1 * | 3/2007 | Israni et al. | 707/809 |
| 2003/0101036 A1 * | 5/2003 | Nagel | 703/13 |

FOREIGN PATENT DOCUMENTS

| | | |
|---|---|---|
| DE | 100 51 745 | 5/2002 |
| DE | 101 14 412 | 11/2002 |
| EP | 0 943 895 | 9/1999 |

* cited by examiner

*Primary Examiner* — Kanjibhai Patel
(74) *Attorney, Agent, or Firm* — Kenyon & Kenyon LLP

(57) ABSTRACT

The present invention relates to a method for subdividing the road pattern in digital road maps into segments, in which, starting from the digital road maps in which the road pattern is subdivided into successive segments, new segment borders are established via new segment starting points and segment end points, by selecting the segment starting points and the segment end points in such a way that the shape of the segments between the segment starting points and the segment end points does not change. The invention also relates to the computation of the road pattern with the aid of digital road maps, in which the road is subdivided into successive segments, to each of which one segment starting point and one segment end point is assigned. The shape of the segment is established and, from its relative position, its pattern is computed with the aid of the number of support points situated between the segment starting points and the segment end points, and/or with the aid of transition conditions between the segments and/or the consideration of attributes.

24 Claims, 1 Drawing Sheet

METHOD FOR SEGMENTING AND COMPUTING THE PATTERN OF A ROAD

FIELD OF THE INVENTION

The present invention relates to a method for subdividing the pattern of a road, in digital maps, into segments, in which, starting from the digital road maps in which the pattern of the road is subdivided into consecutive segments, new segment borders are established via new segment starting points and segment end points, as well as a method for calculating the pattern of the road with the aid of digital road maps in which the road is subdivided into consecutive segments to which a segment starting point and segment end point is assigned.

BACKGROUND INFORMATION

Digitized road maps have application to navigation systems for motor vehicles, among other things. The information concerning the road network is stored with the aid of segment starting points and segment end points on a data carrier, for instance, a CD-ROM.

A method for generating a road network map is known from German Patent No. 101 14 412, in which the pattern of the road is described by a clothoid between a segment starting point and a segment end point. The respective position of the vehicle or the pattern of the road segment is calculated.

An alternative method is also described in German Patent No 101 14 412, in which the pattern of the road between a segment starting point and a segment end point is described by a straight line. Depending on the curvature of the pattern of the road, the segment starting points and the segment end points are at different distances apart, since one condition says that the direct connection between a segment starting point and a segment end points must not leave the actual pattern of the road. That means that, in the case of curvy patterns of the road, the number of segment starting points and segment end points increases, and with that the quantity of data to be stored also increases.

The composition of respective linear partial pieces has the affect that, in the computation of the length of a stretch of path, a length error is generated. In addition, the accuracy and quality of the segment's starting points and end points and of the virtual road pattern are not sufficient for computing the curvature relationships of the route accurately in such a way that, for instance, a reliable function can be implemented for a curve warning system and/or additional vehicle assistance systems.

SUMMARY OF THE INVENTION

As a result, it is the object of the present invention to make available an improved method whereby an efficient computation of the pattern of a road is possible from segment starting points and segment end points stored in digitized road maps.

According to the present invention, starting from digital road maps in which the pattern of the road is subdivided into successive segments, new segment borders are established via new segment starting points and segment end points in that the segment starting points and the segment end points are selected in such a way that the shape of the segments between the segment starting points and the segment end points does not change, thus, for example, a straight line, a circular segment or a curve remains, and the segment borders enclose exactly one shape. The segment borders are different as a rule, in this context, from the current position of the segment starting points and the segment end points, which are also designated as shape points or support points below. The new segments have a shape of straight lines, circular arcs and clothoids, for example. Thus, new shape points are computed, which are filed on a data carrier. Now, since the segment borders are precisely known, the computation of the curvatures based on the shape points is clearly simplified, because, by the exact establishment of the segment borders, the computation of the pattern of the road is made substantially easier.

Between the segment borders, additional support points are required, in order to determine in each case the pattern within the segment borders. This is done, for example, by the number of support points establishing the shape of the pattern between the segment starting points and the segment end points, that is, a straight line, a circle, a clothoid or the like. This may also be done, for instance, as a function of ahe road class, for example, for expressways, two additional support points within a segment are able to establish a clothoid, whereas in the case of circular roads it may be a third order polynomial. Thus, the result is a treatment adapted to the road class. Beyond that, additional attributes may also be considered, such as "one-lane roads", "multi-lane roads", "circular traffic", or the like. When the shape of the pattern of the road has been established with the aid of the number of support points, the appropriate formula can then be identified for computing the exact pattern for these shapes of the pattern, from the positions of the segment starting points and the segment end points and the support points. For a third degree polynomial, for example, an equation system having four equations of the form $y_i = a + bx_i + cx_i^2 + dx_i^3$ would have to be solved, where $x_i$ and $y_i$ correspond in each case to the segment starting points and the segment end points projected onto the earth's surface, as well as the support point positions.

An additional possibility is the use of additional conditions, such as a twice continuous differentiability at the segment borders, so that additional constraints for the pattern of the road come about, and perhaps also for the shape of the segments, so that, within the segments, support points are able to be saved. Consequently, the pattern of the road is, besides, also able to be established, not only via the number of the support points present between the segment borders, but, in supplement or alternatively, via the transition conditions defined between the segments, or the shape of the segment or while additionally taking into consideration the position of the segment border points and/or additional attributes.

Because of the method described, it is possible to continue to operate current navigation algorithms, because the implementation of the support points as well as the segment starting points and the segment end points, as such, are furthermore present in the data, but the segment starting points and the segment end points as well as the support points are intelligently modified, so that, at the same time, a unique, highly accurate curvature computation can be carried out, at a clearly reduced complexity. The data volume is reduced at an higher accuracy. The location of a vehicle on the road network is able to take place more accurately. The pattern of the road is able to be visualized more exactly.

One variant of the present invention provides that the road is subdivided into segments, and at least one starting point and one end point is assigned to each segment. In order to obtain information on the shape of the segment, the number of support points is used that is provided between the segment starting point and the segment end point, and/or transition conditions between the segments, for instance a continuous transition. With the aid of the number of support points situated between the segment starting points and the segment end points and/or the transition conditions between the segments, the shape of the segments is established, and with the aid of the position of the segment starting points and the segment end points and the support points to one another, the pattern of the road or the segment is computed. For the computation of the pattern, the support point(s) is/are drawn upon, if such is/are present. It is achieved thereby that, in response to a minimal, stored data volume an optimal pattern computation is able to take place.

Advantageous specific embodiments of the method according to the present invention provide that the segment is regarded as a straight line if no additional support point is assigned. For the case in which the pattern of the road between a starting point and an end point may be regarded as approximately straight, only those two points have to be given by which the data volume and the number of data to be stored are able to be reduced.

If, in a particular segment, the road runs approximately in a circular arc, an additional support point is assigned to this segment. The pattern of the road can then be computed via the starting point and the end point as well as the additional support point that lies on the circular arc section. Finally, two or more additional support points may be assigned to a segment, if the road runs in a curved manner in the corresponding section. If the pattern of the road is able to be described as a clothoid, two support points are provided for more complex patterns, which have to be represented as a polynomial if a corresponding number of support points is provided, in order to have available sufficient boundary values to solve the polynomial.

Whereas in the related art the shape of the segment in the respective method is basically established, for instance, as a straight line or a clothoid, in the method according to the present invention, a variable assignment of the shape to the respective segment is made possible. The assignment or the establishment of the shape is affected using data which may at the same time be used, in this context, for the computation of the pattern of the road. Thus, fewer segment starting points and segment end points are able to be used. The computation of the pattern becomes more accurate and faster, and the data volume to be stored becomes optimized.

The end point of a segment is advantageously the starting point of the next segment at the same time, in order to have to store only a minimum data volume. The pattern of the road lying between the individual starting points and end points is computed, using mathematical methods, using the support points as boundary value conditions. This makes possible an efficient computation of the road curvatures without it being necessary to store curvature data in addition to the starting points and the end points and possibly the support points. A restriction with respect to the mathematical methods suitable for the computation is not given. The patterns of the segments are preferably computed using straight lines, circular arcs, clothoids, polynomials or splines. By using the method according to the present invention, an error in length is also reduced, which comes about in response to an exclusively linear connection of the segment starting points and the segment end points, especially on long sections rich in curves.

In principle, any number of support points is possible, and the number depends on the function on which the mathematical method is based. A third order polynomial requires two support points, since, together with the starting point and the end point, altogether four points exist for solving the equation system.

If additional conditions on the pattern of the curvature are known, for example, twice continuous differentiability, additional support points are able to be saved. However, in this case it may be required that data be computed in the adjacent segment and possibly recursively in their adjacent segments, in order to obtain an additional equation for solving the system, for example, in that the slope at a common segment point (end point of a segment which is at the same time the starting point of the next segment) is used.

In order to be able to distinguish the segment starting points and the segment end points from the support points, the support points are provided with attributes. The distinction can be made, for instance, by marking the support points with flags.

In order to be able to use existing data records, it is provided that, based on present, digital road maps, the segment starting points and the segment end points be recomputed, and the shape of the intervening segments be established via the number of the support points. The original, digital road maps are used as starting material, but the segment starting points and the segment end points are recalculated if necessary, and the shape, that is, the basic shape of the segment is established as, for instance, a straight line, a circular arc or a clothoid between the starting points and the end points. The so-called shape points of usual navigation systems may be partially taken over, so that the functions in these navigation systems do not have to be changed and that the navigation systems maintain their operability even using the newly set-up digitized roads.

A refinement of the present invention provides that the pattern of the road is established via additional conditions with respect to the transition at the segment boundaries or via attributes of the segments, such as the class of the road or the "form of way" (such as circular traffic, one-lane road, etc.).

DETAILED DESCRIPTION

Figure 1:
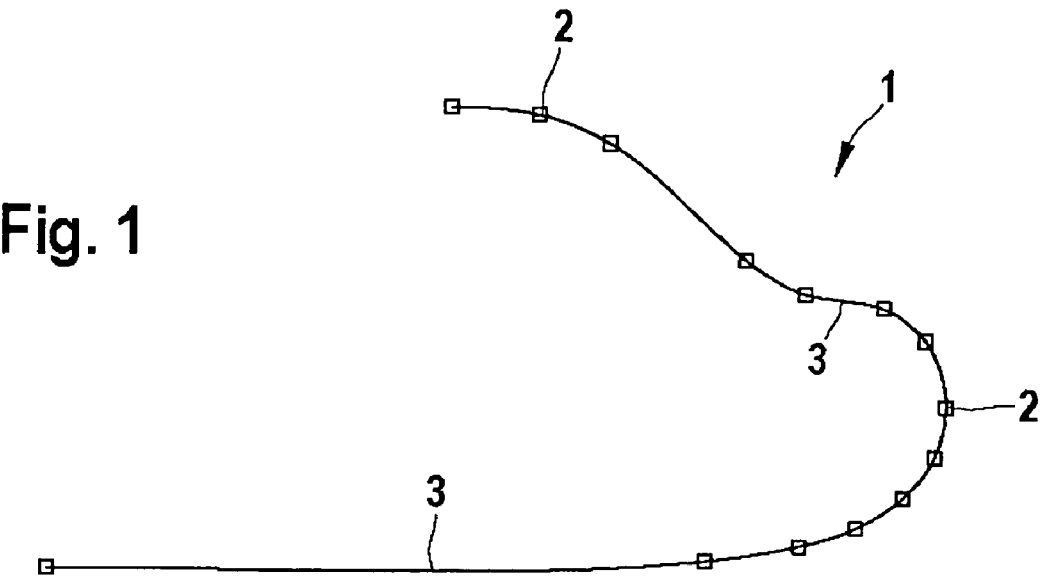
FIG. 1 shows the representation of a road pattern according to the related art.

FIG. 1 shows the pattern of a road section 1 having segment starting points and segment end points 2, which are symbolized by small squares. The individual segment starting points and segment end points 2 lie on the real road pattern of the road. In the internal representation and the display illustration, segment starting points and segment end points 2, in deviation from the illustration in FIG. 1, are connected by straight line paths, so that the pattern of road 1 comes about as a combination or concatenation of linear sections 3. For reasons of better clarity, only a few segment starting points and segment end points 2 and road sections 3 are provided with a reference numeral.

In total, in order to illustrate the pattern of road 1 in FIG. 1, fourteen segment starting points and segment end points 2 are required, which have to be stored on a data medium that is able to be electronically read out, such as a CD-ROM. Especially in road patterns having many curves, shown in FIG. 1 at the right edge, many segment starting points and segment end points 2 are required, in order that one may obtain a sufficiently accurate representation of the road pattern.

Figure 2:
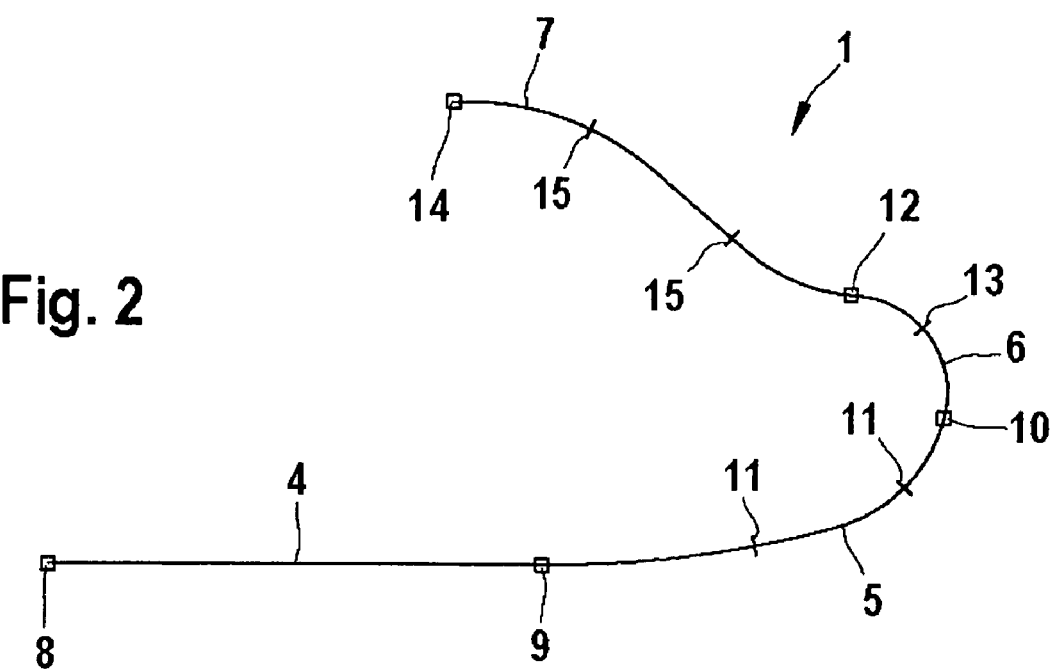
FIG. 2 shows the road pattern of FIG. 1 having the segment starting points and the segment end points according to the present invention.

The pattern of the same road 2 is reproduced in FIG. 2. However, differently from FIG. 1, in this case fewer segment starting points and segment end points 8, 9, 10, 12, 14 are required. The pattern of road 1 was subdivided into segments 4, 5, 6, 7 that are subsequent to one another. The individual segments 4 through 7 have curvature patterns that deviate from one another. Thus, the shape of segment 4 is a straight line, that of segment 5 is a clothoid transition, which turns into a circle of segment 6. This is followed by segment 7, which has the shape of a clothoid having an S curve.

The individual segments 4 through 7 in each case have a different number of support points 11, 13, 15. Segment 4 is exactly defined as a linear segment by starting point 8 and an end point 9. Additional support points are not required. Point 9 is both the end point of segment 4 and the starting point of segment 5. Segment 5 requires as clothoid transition two additional support points 11 besides starting point 9 and end point 10, in order to be able exactly to establish and compute the pattern of the road using these four boundary conditions (starting point and end point as well as two support points).

Segment 6 is exactly defined as circular section by starting point 10, end point 12 and an additional support point 13, which lies on the circular arc. For the exact establishment of the shape and for the determination and computation of the pattern, the clothoid of segment 7 requires starting point 12 and end point 14 of segment 7, as well as two additional support points 15.

The pattern of road 1 is thus defined in FIG. 2 by fewer segment starting points and segment end points 8, 9, 10, 12, 14 and support points 11, 13, 15 than in FIG. 1, namely, by only five starting points and end points and five additional support points. Thus, using a lower data volume, a higher accuracy is able to be achieved. Segment starting points and segment end points 8, 9, 10, 12, 14 and support points 11, 13, 15 may be ascertained offline.

If the pattern of the road is computed again, or if the segment starting points and the segment end points and the support points are to be set anew and in an optimized fashion, present segment starting points and segment end points, which were ascertained by current conditions, curvature data, points of interest (POIs) and or (a) combination(s) of various data types are able to be used. The new segment starting points and segment end points and the support points are computed and set via an algorithm, in order to be able to compute the pattern of the road in an optimal fashion. During the new computation, erroneous or very noise-infested data are able to remain unconsidered, in order to hold later inaccuracies and computation errors to as low as possible.

From the ascertained segment starting points and segment end points and the support points, the road pattern may be generated uniquely and using less computing expenditure by online computation. Because of the greater accuracy, the length error, which frequently occurred in current navigation systems during the computation of the travel route, is also able to be clearly reduced, especially in road patterns having many curves.

In addition, there is the possibility of maintaining usual segment starting points and segment end points in the stored data volume, so that the functions in current navigation systems do not have to be changed. The new support points for the curvature computation may be marked by flags or attributes, in order to distinguish them from segment starting points and segment end points. In this context, it is also possible to use different curvature representations, depending on the land or road class. The segment starting points and the segment end points and the support points are in each case able to be adapted to the most suitable representation.

Since, by using the new support points, the curve patterns and the curvature representations are able to be computed uniquely and accurately, the data of the computed road pattern are able to be made available via interfaces of driver assistance systems, as for instance curve warning systems, light controls, or the like.

What is claimed is:

1. A method for subdividing a road pattern in digital road maps into segments, the method comprising:
    using a navigation system to perform the following steps:
    starting from digital road maps in which the road pattern is subdivided into successive segments,
    establishing new segment borders via new segment starting points and segment end points by selecting the segment starting points and the segment end points in such a way that the shape of the segments between the segment starting points and the segment end points does not change.

2. A method for computing a road pattern with the aid of digital road maps, the method comprising:
    using a navigation system to perform the following steps:
    subdividing a road into successive segments to each of which one segment starting point and one segment end point is assigned; and
    establishing wherein the shape of the segment and computing its pattern with the support points situated between the segment starting points and the segment end points, and/or transition conditions between the segments and/or of an attribute.

3. The method as recited in claim 1, wherein the segment pattern is computed while additionally taking into consideration a position of support points and the position of the segment starting points and the segment end points.

4. The method as recited in claim 1, wherein in response to errors of a support point, the segment is established as a straight line.

5. The method as recited in claim 1, wherein the segment is established as a circular arc via only one support point.

6. The method as recited in claim 1, wherein the segment is established as a clothoid via two support points.

7. The method as recited in claim 1, wherein the support points are provided with attributes which distinguish them from segment starting points and segment end points.

8. The method as recited in claim 1, wherein the segment starting points and the segment end points are computed anew based on present, digital road maps.

9. The method as recited in claim 1, wherein a segment end point of a segment is used as the segment starting point of the segment immediately subsequent to it.

10. The method as recited in claim 1, wherein the segment starting point, the segment end point and the support points that are present are used for the computation of the pattern of the segment.

11. The method as recited in claim 1, wherein the road pattern is established via additional conditions with respect to the transition between the segments or via attributes at the segments.

12. The method as recited in claim 2, wherein in response to errors of a support point, the segment is established as a straight line, wherein the support points are provided with attributes which distinguish them from segment starting points and segment end points, and wherein the segment starting points and the segment end points are computed anew based on present, digital road maps.

13. The method as recited in claim 2, wherein the segment is established as a circular arc via only one support point, wherein the support points are provided with attributes which distinguish them from segment starting points and segment end points, and wherein the segment starting points and the segment end points are computed anew based on present, digital road maps.

14. The method as recited in claim 2, wherein the segment is established as a clothoid via two support points, wherein the support points are provided with attributes which distinguish them from segment starting points and segment end points, and wherein the segment starting points and the segment end points are computed anew based on present, digital road maps.

15. The method as recited in claim 2, wherein the support points are provided with attributes which distinguish them from segment starting points and segment end points, wherein the segment starting points and the segment end points are computed anew based on present, digital road maps, and wherein a segment end point of a segment is used as the segment starting point of the segment immediately subsequent to it.

16. The method as recited in claim 2, wherein the support points are provided with attributes which distinguish them from segment starting points and segment end points, wherein the segment starting points and the segment end points are computed anew based on present, digital road maps, and wherein the segment starting point, the segment end point and the support points that are present are used for the computation of the pattern of the segment.

17. The method as recited in claim 2, wherein the support points are provided with attributes which distinguish them from segment starting points and segment end points, wherein the segment starting points and the segment end points are computed anew based on present, digital road maps, and wherein the road pattern is established via additional conditions with respect to the transition between the segments or via attributes at the segments.

18. A non-transitory computer readable medium having a computer program, which is executable by a processor, comprising:
a program code arrangement having program code for computing a road pattern with the aid of digital road maps, by performing the following:
subdividing a road into successive segments to each of which one segment starting point and one segment end point is assigned; and
establishing the shape of the segment and computing its pattern with the support points situated between the segment starting points and the segment end points, and/or with-transition conditions between the segments and/or of an attribute.

19. The non-transitory computer readable medium as recited in claim 18, wherein in response to errors of a support point, the segment is established as a straight line, wherein the support points are provided with attributes which distinguish them from segment starting points and segment end points, and wherein the segment starting points and the segment end points are computed anew based on present, digital road maps.

20. The non-transitory computer readable medium as recited in claim 18, wherein the segment is established as a circular arc via only one support point, wherein the support points are provided with attributes which distinguish them from segment starting points and segment end points, and wherein the segment starting points and the segment end points are computed anew based on present, digital road maps.

21. The non-transitory computer readable medium as recited in claim 18, wherein the segment is established as a clothoid via two support points, wherein the support points are provided with attributes which distinguish them from segment starting points and segment end points, and wherein the segment starting points and the segment end points are computed anew based on present, digital road maps.

22. The non-transitory computer readable medium as recited in claim 18, wherein the support points are provided with attributes which distinguish them from segment starting points and segment end points, wherein the segment starting points and the segment end points are computed anew based on present, digital road maps, and wherein a segment end point of a segment is used as the segment starting point of the segment immediately subsequent to it.

23. The non-transitory computer readable medium as recited in claim 18, wherein the support points are provided with attributes which distinguish them from segment starting points and segment end points, wherein the segment starting points and the segment end points are computed anew based on present, digital road maps, and wherein the segment starting point, the segment end point and the support points that are present are used for the computation of the pattern of the segment.

24. The non-transitory computer readable medium as recited in claim 18, wherein the support points are provided with attributes which distinguish them from segment starting points and segment end points, wherein the segment starting points and the segment end points are computed anew based on present, digital road maps, and wherein the road pattern is established via additional conditions with respect to the transition between the segments or via attributes at the segments.

\* \* \* \* \*